(12) United States Patent
Jang et al.

(10) Patent No.: US 9,273,173 B2
(45) Date of Patent: Mar. 1, 2016

(54) FLAME RETARDANT ACRYLIC-BASED COPOLYMER, RESIN COMPOSITION COMPRISING SAME AND MOLDING FORM THEREOF

(71) Applicant: CHEIL INDUSTRIES INC., Gumi-si, Gyeongsangbuk-do (KR)

(72) Inventors: Joo Hyun Jang, Uiwang-si (KR); Kee Hae Kwon, Uiwang-si (KR); Jin Hwa Chung, Uiwang-si (KR); Yong Hee Kang, Uiwang-si (KR); Ja Kwan Goo, Uiwang-si (KR); Man Suk Kim, Uiwang-si (KR); Kwang Soo Park, Uiwang-si (KR)

(73) Assignee: CHEIL INDUSTRIES INC., Gumi-si (KR)

( * ) Notice: Subject to any disclaimer, the term of this patent is extended or adjusted under 35 U.S.C. 154(b) by 0 days.

(21) Appl. No.: 14/365,101

(22) PCT Filed: Nov. 28, 2012

(86) PCT No.: PCT/KR2012/010176
§ 371 (c)(1),
(2) Date: Jun. 12, 2014

(87) PCT Pub. No.: WO2013/094889
PCT Pub. Date: Jun. 27, 2013

(65) Prior Publication Data
US 2014/0346418 A1    Nov. 27, 2014

(30) Foreign Application Priority Data

Dec. 19, 2011  (KR) .......................... 10-2011-0137733

(51) Int. Cl.
| | |
|---|---|
| *C08F 220/18* | (2006.01) |
| *C08L 33/08* | (2006.01) |
| *C08L 69/00* | (2006.01) |
| *C08F 230/02* | (2006.01) |
| *C08F 220/14* | (2006.01) |
| *C08L 33/18* | (2006.01) |

(52) U.S. Cl.
CPC ............. *C08F 220/18* (2013.01); *C08F 220/14* (2013.01); *C08F 230/02* (2013.01); *C08L 33/08* (2013.01); *C08L 33/18* (2013.01); *C08L 69/00* (2013.01); *C08L 2201/02* (2013.01)

(58) Field of Classification Search
USPC .................................. 526/274, 278; 524/558
See application file for complete search history.

(56) References Cited

U.S. PATENT DOCUMENTS

| 3,030,347 | A | 4/1962 | O'Brien et al. |
| 2008/0073624 | A1 | 3/2008 | Choi et al. |
| 2010/0197850 | A1 | 8/2010 | Kim et al. |
| 2011/0160400 | A1 | 6/2011 | Lee et al. |

FOREIGN PATENT DOCUMENTS

| CN | 101148533 A | 3/2008 |
| CN | 101827872 A | 9/2010 |
| CN | 102167770 A | 8/2011 |
| KR | 10-2003-0055443 A | 7/2003 |
| KR | 10-0832518 B1 | 5/2008 |
| KR | 10-2011-0077881 A | 7/2011 |

OTHER PUBLICATIONS

Canadell et al. (Polymer Degradation and Stability, 2007, 92, 1482-1490).*
Ebdon et al. (Polymer Degradation and Stability, 2000, 69, 267-277).*
International Search Report for PCT/KR2012/010176, mailed on Feb. 28, 2013, 2 pages.
Price, Dennis et al., Flame retarding poly(methyl methacrylate) with phosphorus-containing compounds: comparison of an additive with a reactive approach, Polymer Degradation and Stability vol. 74, 2001, pp. 441-447.
SIPO Office action dated Jun. 3, 2015 in corresponding CN Application No. 201280062916.9, with English translation, 21 pages.

* cited by examiner

*Primary Examiner* — Vu A Nguyen
(74) *Attorney, Agent, or Firm* — Lewis Roca Rothgerber Christie LLP

(57) ABSTRACT

The present invention provides a flame retardant acrylic-based copolymer which includes a derivative unit obtained from a monomer mixture comprising: (A) a (meth)acrylic monomer; (B) at least one vinyl monomer selected from the group consisting of an aromatic vinyl monomer and an unsaturated nitrile monomer; and (C) a phosphorus-based (meth) acrylic monomer. The flame retardant acrylic copolymer has high refractivity and exhibits excellent flame retardancy and scratch resistance.

13 Claims, No Drawings

FLAME RETARDANT ACRYLIC-BASED COPOLYMER, RESIN COMPOSITION COMPRISING SAME AND MOLDING FORM THEREOF

CROSS-REFERENCE TO RELATED APPLICATION(S)

This application is a National Phase Patent Application and claims priority to and the benefit of International Application Number PCT/KR2012/010176, filed on Nov. 28, 2012, which claims priority to Korean Patent Application Number 10-2011-0137733, filed on Dec. 19, 2011, the entire contents of all of which are incorporated herein by reference.

TECHNICAL FIELD

The present invention relates to a flame retardant acrylic copolymer, a resin composition including the same, and a molded article produced using the same. More particularly, the present invention relates to an eco-friendly flame retardant acrylic copolymer having high refractivity, excellent flame retardancy and scratch resistance, a resin composition including the same, and a molded article produced using the same.

BACKGROUND ART

Thermoplastic resins exhibit excellent physical properties such as low specific gravity, good moldability and good impact resistance, as compared with glass or metal. With the trend of low cost, larger and lighter weight electric/electronic products, plastic products made of thermoplastic resins are quickly replacing existing glass or metal-based products, thereby broadening applications thereof from electric and electronic products to automobile components.

Particularly, demand for transparent resins has increased in line with recent trend of reduction in thickness of electric/electronic products and variation of design concept. As a result, there is increasing demand for functional transparent materials prepared by imparting functionality such as scratch resistance or flame retardancy to existing transparent resins.

One example of transparent scratch resistant resins is an acrylic resin represented by polymethyl methacrylate (PMMA). Particularly, PMMA exhibits excellent properties in terms of transparency, weather resistance, mechanical strength and scratch resistance, but has low impact resistance and flame retardancy. To enhance impact resistance while maintaining transparency of PMMA, acrylic impact modifiers prepared to have the same index of refraction as that of PMMA are generally used. However, the acrylic impact modifiers have a drawback of lower impact resistance efficiency than butadiene-based impact modifiers. In addition, the method of adding a flame retardant to secure flame retardancy of PMMA does not secure flame retardancy, and can reduce other properties such as thermal resistance and impact resistance while deteriorating thermal stability due to the flame retardant upon processing. As a result, there is no report up to now that the transparent acrylic resin is used alone to provide flame retardancy.

In addition to PMMA, a transparent ABS resin can be used as a transparent scratch resistant material. A methyl methacrylate-acrylonitrile-butadiene-styrene copolymer resin (hereinafter, "transparent ABS resin") is used to enhance transparency of existing ABS resins. The transparent ABS resin is prepared by blending a methyl methacrylate-styrene-acrylonitrile copolymer resin (hereinafter "MSAN resin") with a graft copolymer (hereinafter "g-MABS resin"), which is prepared by graft polymerization of styrene monomer and acrylonitrile monomer together with methyl methacrylate monomer to a butadiene-based rubbery polymer. Here, the MSAN resin exhibits good properties in terms of transparency and scratch resistance while providing good mechanical properties, such as impact resistance and the like, as compared with PMMA. In addition, the MSAN resin has high refractivity and thus exhibits high transparency with the butadiene-based impact modifier. However, like the PMMA resin, the transparent ABS resin prepared using the MSAN resin does not secure good flame retardancy due to the methyl methacrylate having low flame retardancy only by addition of the flame retardant, and can suffer from deterioration in impact resistance, thermal resistance, and thermal stability upon processing due to the flame retardant.

In the present invention, a phosphorus (meth)acrylic monomer is introduced to prepare a phosphorus-based copolymer resin, which exhibits excellent flame retardancy without using a flame retardant and has high refractivity while maintaining excellent transparency and scratch resistance.

DISCLOSURE

Technical Problem

An object of the present invention is to provide an acrylic copolymer having high refractivity and excellent flame retardancy.

Another object of the present invention is to provide an eco-friendly flame retardant acrylic copolymer.

A further object of the present invention is to provide an acrylic copolymer capable of minimizing deterioration in transparency and colorability when blended with a highly refractive resin.

A further object of the present invention is to provide an acrylic copolymer having excellent scratch resistance.

Technical Solution

One aspect of the present invention relates to a flame retardant acrylic copolymer. In some embodiments, the flame retardant acrylic copolymer includes a derivative unit obtained from a monomer mixture including: (A) a (meth)acrylic monomer; (B) at least one vinyl monomer selected from the group consisting of an aromatic vinyl monomer and an unsaturated nitrile monomer; and (C) a phosphorus-based (meth)acrylic monomer represented by Formula 1:

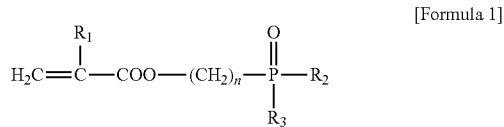

[Formula 1]

(wherein $R_1$ is hydrogen or a methyl group; n is an integer from 0 to 10; and $R_2$ and $R_3$ are each independently —O(CH$_2$)$_q$ X, in which q is an integer from 0 to 3 and X is a $C_1$ to $C_6$ substituted or unsubstituted aliphatic hydrocarbon, a $C_5$ to $C_{20}$ substituted or unsubstituted alicyclic hydrocarbon, or a $C_6$ to $C_{20}$ substituted or unsubstituted aromatic hydrocarbon).

In some embodiments, at least one of $R_2$ and $R_3$ may be —O—CH$_3$.

In one embodiment, the flame retardant acrylic copolymer is a copolymer of a monomer mixture including: about 5 wt% to about 94 wt % of the (A) (meth)acrylic monomer; about 5 wt % to about 94 wt % of the (B) vinyl monomer; and about 1 wt % to about 50 wt % of the (C) phosphorus-based (meth)acrylic monomer.

In some embodiments, the (A) (meth)acrylic monomer may include a structure represented by Formula 2:

[Formula 2]

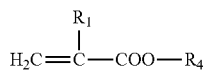

(wherein $R_1$ is hydrogen or a methyl group; $R_4$ is a $C_1$ to $C_{20}$ substituted or unsubstituted aliphatic hydrocarbon, a $C_5$ to $C_{20}$ substituted or unsubstituted alicyclic hydrocarbon, or a $C_6$ to $C_{20}$ substituted or unsubstituted aromatic hydrocarbon).

The (B) vinyl monomer may include at least one selected from the group consisting of styrene, p-methylstyrene, α-methylstyrene, halogen or alkyl-substituted styrene, acrylonitrile, and methacrylonitrile.

The (C) phosphorus-based (meth)acrylic monomer may include at least one selected from the group consisting of dimethyl(methacryloyloxymethyl)phosphonate, dimethyl(methacryloyloxyethyl)phosphonate, dimethyl(acryloyloxymethyl)phosphonate, methylethyl(methacryloyloxymethyl)phosphonate, methylethyl(acryloyloxymethyl)phosphonate, diethyl(methacryloyloxymethyl)phosphonate, diethyl(methacryloyloxyethyl)phosphonate, diethyl(acryloyloxymethyl)phosphonate, dipropyl(methacryloyloxymethyl)phosphonate, and dipropyl(methacryloyloxyethyl)phosphonate.

The flame retardant acrylic copolymer has a weight average molecular weight from about 5,000 g/mol to about 500,000 g/mol, and a glass transition temperature (Tg) from about 60° C. to about 110° C.

The flame retardant acrylic copolymer may have an index of refraction at a thickness of 2.5 mm from about 1.491 to about 1.584.

The flame retardant acrylic copolymer may contain about 0.1 wt % to about 7.5 wt % of phosphorus. In addition, the flame retardant acrylic copolymer may have a flame retardancy level of V2 or higher as measured on a 3.2 mm thick specimen in accordance with UL94.

The flame retardant acrylic copolymer may have a transmittance of about 85% or more, as measured on a 2.5 mm thick specimen in accordance with ASTM D1003.

The flame retardant acrylic copolymer may have a scratch width of about 250 μm or less, as measured on a 2.5 mm thick specimen under a load of 1,000 g at a scratch speed of 75 mm/min using a spherical metal tip having a diameter of 0.7 mm in accordance with a BSP (Ball-type Scratch Profile) test.

The flame retardant acrylic copolymer may further include additives such as flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, flame-proofing agents, and the like. The additives may be used alone or as mixtures thereof.

Another aspect of the present invention relates to a resin composition including the flame retardant acrylic copolymer. In some embodiments, the resin composition may include the flame retardant acrylic copolymer; and a polycarbonate resin.

A further aspect of the present invention relates to a molded article comprising the flame retardant acrylic copolymer.

Advantageous Effects

The present invention provides eco-friendly flame retardant acrylic copolymers, which have high refractivity, exhibit excellent flame retardancy, and is capable of minimizing deterioration in transparency and colorability when blended with a highly refractive resin.

BEST MODE

Hereinafter, embodiments of the present invention will be described in detail. However, it should be understood that the following embodiments are given by way of illustration only and the present invention is not limited thereto. The scope of the present invention is defined only by the claims and equivalents thereof.

As used herein, the term "(meth)acrylic" may refer to both "acrylic" and "methacrylic", unless specifically stated otherwise. For example, "(meth)acrylate" means both "acrylate" and "methacrylate".

Further, unless specifically stated otherwise, the term "substituted" means that at least one hydrogen atom in a compound is substituted with a halogen atom (F, Cl, Br or I), a hydroxyl group, a nitro group, a cyano group, an amino group, an azido group, an amidino group, a hydrazino group, a hydrazono group, a carbonyl group, a carbamyl group, a thiol group, an ester group, a carboxyl group or salts thereof, a sulfonic acid group or salts thereof, a phosphoric acid group or salts thereof, a $C_1$ to $C_{20}$ alkyl group, a $C_2$ to $C_{20}$ alkenyl group, a $C_2$ to $C_{20}$ alkynyl group, a $C_1$ to $C_{20}$ alkoxy group, a $C_6$ to $C_{30}$ aryl group, a $C_6$ to $C_{30}$ aryloxy group, a $C_3$ to $C_{30}$ cycloalkyl group, a $C_3$ to $C_{30}$ cycloalkenyl group, a $C_3$ to $C_{30}$ cycloalkynyl group, or combinations thereof.

A flame retardant acrylic copolymer according to the present invention includes a derivative unit obtained from a monomer mixture including (A) a (meth)acrylic monomer; (B) a vinyl monomer; and (C) a phosphorus-based (meth)acrylic monomer.

For example, the flame retardant acrylic copolymer may include the following repeat units (a), (b) and (c):

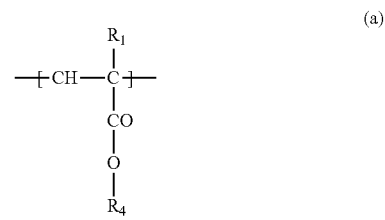

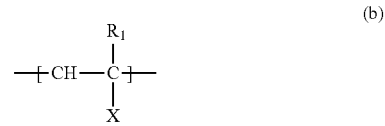

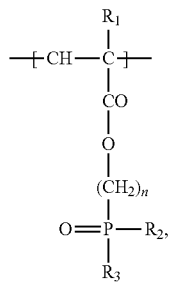

in Formula (a), $R_1$ is hydrogen or a methyl group, $R_4$ is a $C_1$ to $C_{20}$ substituted or unsubstituted aliphatic hydrocarbon, a $C_5$ to $C_{20}$ substituted or unsubstituted alicyclic hydrocarbon, or a $C_6$ to $C_{20}$ substituted or unsubstituted aromatic hydrocarbon;

in Formula (b), $R_1$ is hydrogen or a methyl group, and Y is at least one selected from a substituted or unsubstituted aromatic group and —CN; and in Formula (c), $R_1$ is hydrogen or a methyl group, and $R_2$ and $R_3$ are each independently —O(CH$_2$)$_q$X, in which q is an integer from 0 to 3 and X is a $C_1$ to $C_6$ substituted or unsubstituted aliphatic hydrocarbon, a $C_5$ to $C_{20}$ substituted or unsubstituted alicyclic hydrocarbon, or a $C_6$ to $C_{20}$ substituted or unsubstituted aromatic hydrocarbon.

Hereinafter, each of the monomers constituting the copolymer is described in more detail.

(A) (Meth)Acrylic Monomer

The (meth)acrylic monomer (A) may include an aliphatic (meth)acrylate. For example, the (meth)acrylic monomer (A) may be a $C_1$ to $C_{20}$ alkyl (meth)acrylate.

In one embodiment, the (meth)acrylic monomer (A) may include a structure represented by Formula 2:

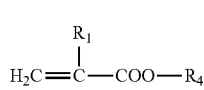

[Formula 2]

(wherein $R_1$ is hydrogen or a methyl group; and $R_4$ is a $C_1$ to $C_{20}$ substituted or unsubstituted aliphatic hydrocarbon, a $C_5$ to $C_{20}$ substituted or unsubstituted alicyclic hydrocarbon, or a $C_6$ to $C_{20}$ substituted or unsubstituted aromatic hydrocarbon).

Examples of the (meth)acrylic monomer (A) may include methyl(meth)acrylate, ethyl(meth)acrylate, propyl(meth)acrylate, butyl(meth)acrylate, hexyl(meth)acrylate, stearyl (meth)acrylate, and lauryl(meth)acrylate, without being limited thereto. These (meth)acrylic monomers (A) may be used alone or as mixtures thereof.

The (meth)acrylic monomer (A) may be present in an amount of about 5 wt % to about 94 wt % in the flame retardant acrylic copolymer. Within this range, the flame retardant acrylic copolymer can have good property balance between scratch resistance, impact strength and flame retardancy. Preferably, the (meth)acrylic monomer (A) is present in an amount of about 30 wt % to about 85 wt %, for example, about 35 wt % to about 75 wt %. In some embodiments, the (meth)acrylic monomer (A) is present in an amount of about 40 wt % to about 65 wt %.

(B) Vinyl Monomer

The vinyl monomer (B) according to the present invention may include at least one selected from the group consisting of an aromatic vinyl monomer and an unsaturated nitrile monomer.

In some embodiments, the vinyl monomer (B) may be composed of about 0 wt % to about 100 wt % of (b1) an aromatic vinyl monomer and about 0 wt % to about 100 wt % of (b2) an unsaturated nitrile monomer. When the (b1) aromatic vinyl monomer and the (b2) unsaturated nitrile monomer are used at the same time, the vinyl monomer (B) may be composed of about 55 wt % to about 99 wt % of the (b1) aromatic vinyl monomer and about 1 wt % to about 45 wt % of the (b2) unsaturated nitrile monomer. Preferably, the vinyl monomer (B) is composed of about 65 wt % to about 95 wt % of the (b1) aromatic vinyl monomer and about 5 wt % to about 35 wt % of the (b2) unsaturated nitrile monomer. Within this range, the flame retardant acrylic copolymer can have improved property balance between excellent fluidity and scratch resistance.

Examples of the aromatic vinyl monomer may include styrene, p-methylstyrene, α-methylstyrene, and halogen or alkyl-substituted styrene, without being limited thereto. These may be used alone or as mixtures thereof.

Examples of the unsaturated nitrile monomer may include acrylonitrile and methacrylonitrile, without being limited thereto. These may be used alone or as mixtures thereof.

In this invention, the vinyl monomer (B) may be present in an amount of about 5 wt % to about 94 wt % in the flame retardant acrylic copolymer. Within this range, the flame retardant acrylic copolymer can have property balance between scratch resistance, fluidity, transparency and flame retardancy. Preferably, the vinyl monomer (B) is present in an amount of about 7 wt % to about 60 wt %, for example, about 20 wt % to about 50 wt %. In some embodiments, the vinyl monomer (B) is present in an amount of about 25 wt % to about 45 wt %.

(C) Phosphorus-Based (Meth)Acrylic Monomer

The phosphorus-based (meth)acrylic monomer (C) according to the present invention may be represented by Formula 1:

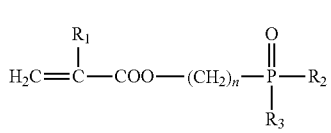

[Formula 1]

(wherein $R_1$ is hydrogen or a methyl group; n is an integer from 0 to 10; and $R_2$ and $R_3$ are each independently —O(CH$_2$)$_q$X, in which q is an integer from 0 to 3 and X is a $C_1$ to $C_6$ substituted or unsubstituted aliphatic hydrocarbon, a $C_5$ to $C_{20}$ substituted or unsubstituted alicyclic hydrocarbon, or a $C_6$ to $C_{20}$ substituted or unsubstituted aromatic hydrocarbon).

In some embodiments, X may be a methyl group, a cyclohexyl group, a phenyl group, a methylphenyl group, a methylethylphenyl group, a propylphenyl group, a methoxyphenyl group, a cyclohexylphenyl group, a chlorophenyl group, a bromophenyl group, a phenylphenyl group, or a benzylphenyl group.

In some embodiments, at least one of $R_2$ and $R_3$ may be —O—CH$_3$.

In other embodiments, both $R_2$ and $R_3$ may be —O—CH$_3$ or —O—CH$_2$CH$_3$, or $R_2$ may be —O—CH$_3$ and $R_3$ may be —O—CH$_2$CH$_3$. In this case, the flame retardant acrylic copolymer can have improved property balance between transparency, flame retardancy, and scratch resistance.

In some embodiments, n may range from 0 to 10. In this case, the flame retardant acrylic copolymer can have improved flame retardancy and fluidity.

Examples of the phosphorus-based (meth)acrylic monomer (C) represented by Formula 1 may include dimethyl(methacryloyloxymethyl)phosphonate, dimethyl(methacryloyloxyethyl)phosphonate, dimethyl(acryloyloxymethyl)phosphonate, methylethyl(methacryloyloxymethyl)phosphonate, methyl ethyl(acryloyloxymethyl)phosphonate, diethyl(methacryloyloxymethyl)phosphonate, diethyl(methacryloyloxyethyl)phosphonate, diethyl(acryloyloxymethyl)phosphonate, dipropyl(methacryloyloxymethyl)phosphonate, and dipropyl(methacryloyloxyethyl)phosphonate, without being limited thereto. These may be used alone or in combination thereof.

The phosphorus-based (meth)acrylic monomer (C) may be present in an amount of about 1 wt % to about 50 wt % in the flame retardant acrylic copolymer. Within this range, the flame retardant acrylic copolymer can exhibit flame retardancy, permit polymerization, and does not suffer from deterioration in properties. Preferably, the phosphorus-based (meth)acrylic monomer (C) is present in an amount of about 5 wt % to about 30 wt %. Within this range, the flame retardant acrylic copolymer can have excellent flame retardancy and property balance.

According to the present invention, the flame retardant acrylic copolymer may be prepared by a typical polymerization method known in the art, for example, bulk polymerization, emulsion polymerization, or suspension polymerization. Preferably, the flame retardant acrylic copolymer is prepared by suspension polymerization.

Specifically, the flame retardant acrylic copolymer may be prepared by polymerization of a monomer mixture including the (A) (meth)acrylic monomer; the (B) vinyl monomer; and the (C) phosphorus-based (meth)acrylic monomer.

For example, the flame retardant acrylic copolymer may be prepared by adding a polymerization initiator and a chain-transfer agent to a monomer mixture, which includes about 5 wt % to about 94 wt % of the (A) (meth)acrylic monomer; about 5 wt % to about 94 wt % of the (B) vinyl monomer; and about 1 wt % to about 50 wt % of the (C) phosphorus-based (meth)acrylic monomer, to prepare a reaction mixture, and introducing the reaction mixture into an aqueous solution including a suspension stabilizer, followed by suspension polymerization.

Polymerization temperature and polymerization time may be suitably adjusted. For example, polymerization may be performed at about 65° C. to about 125° C., preferably at about 70° C. to about 120° C., for about 2 hours to about 8 hours.

The polymerization initiator may be a typical radical polymerization initiator known in the art. Examples of the polymerization initiator may include octanoyl peroxide, decanoyl peroxide, lauroyl peroxide, benzoyl peroxide, monochlorobenzoyl peroxide, dichlorobenzoyl peroxide, p-methylbenzoyl peroxide, tert-butyl perbenzoate, azobisisobutyronitrile, and azobis-(2,4-dimethyl)-valeronitrile, without being limited thereto. These may be used alone or as mixtures thereof. In some embodiments, the polymerization initiator may be present in an amount of about 0.01 parts by weight to about 10 parts by weight, preferably about 0.03 parts by weight to about 5 parts by weight, based on 100 parts by weight of the monomer mixture.

The chain-transfer agent may be used to adjust the weight average molecular weight of the flame retardant acrylic copolymer and to improve thermal stability thereof. The weight average molecular weight may also be adjusted by the amount of the polymerization initiator included in the monomer mixture. However, if polymerization is stopped by the chain-transfer agent, a terminal end of the chain has a second carbon structure. The terminal end of the chain having the second carbon structure has stronger bonding strength than an end of a chain having a double bond created when the chain-transfer agent is not used. Thus, addition of the chain-transfer agent can improve thermal stability of the flame retardant acrylic copolymer, thereby improving optical properties thereof.

The chain-transfer agent may be a typical chain-transfer agent known in the art. Examples of the chain-transfer agent may include: alkyl mercaptan in the form of $CH_3(CH_2)_nSH$ (where n is an integer from 1 to 20) including n-butyl mercaptan, n-octyl mercaptan, n-dodecyl mercaptan, t-dodecyl mercaptan, isopropyl mercaptan, n-amyl mercaptan, and the like; halogenated compounds including carbon tetrachloride, and the like; and aromatic compounds including α-methylstyrene dimers and α-ethylstyrene dimers, without being limited thereto. These may be used alone or as mixtures thereof. The chain-transfer agent may be present in an amount of about 0.01 parts by weight to about 10 parts by weight based on 100 parts by weight of the monomer mixture. Within this range, the flame retardant acrylic copolymer can have thermal stability and suitable molecular weight. Preferably, the chain-transfer agent is present in an amount of about 0.03 parts by weight to about 5 parts by weight.

The flame retardant acrylic copolymer according to the present invention may further include at least one typical additive, such as suspension stabilizers, suspension stabilization aids, flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, flame-proofing agents, and the like. The additive may be present in an amount of about 0.001 to about 20 parts by weight based on 100 parts by weight of the monomer mixture, without being limited thereto.

The suspension stabilizer may include: organic suspension stabilizers including polyalkyl acrylate-acrylic acid, polyolefin-maleic acid, polyvinyl alcohol, cellulose, and the like; inorganic suspension stabilizers including tricalcium phosphate, and the like; and mixtures thereof, without being limited thereto.

The suspension stabilization aids may include disodium hydrogen phosphate, sodium dihydrogen phosphate, and the like, and may also include sodium sulfate in order to control solubility of a water-soluble polymer or monomer.

The antioxidant may be octadecyl 3-(3,5-di-tert-butyl-4-hydroxyphenyl)propionate, triethylene glycol-bis-3(3-tert-butyl-4-hydroxy-5-methylphenyl) propionate, 2,6-di-tert-butyl-4-methyl phenol, 2,2'-methylenebis(4-methyl-6-tert-butylphenol), tri(2,4-di-tert-butylphenyl)phosphite, n-octadecyl-3 (3,5-di-tert-butyl-4-hydroxyphenyl)propionate, 1,3,5-tri(3,5-di-tert-butyl-4-hydroxybenzyl) isocyanate, 3-3,5-di-tert-butyl-4-hydroxyphenyl, distearyl thiodipropionate, lauryl thiopropionate methane, and di-phenyl-isooctyl phosphinate, without being limited thereto. These may be used alone or as mixtures thereof.

After polymerization, the monomer mixture is subjected to cooling, washing, dehydration, drying, and the like, thereby providing a flame retardant acrylic copolymer in particle form.

The flame retardant acrylic copolymer may have a weight average molecular weight from about 5,000 g/mol to about 500,000 g/mol, preferably, from about 10,000 g/mol to about 300,000 g/mol. Within this range, the flame retardant acrylic copolymer has property balance between processability, compatibility, and mechanical properties.

The flame retardant acrylic copolymer may have a glass transition temperature (Tg) from about 60° C. to about 110° C., for example, from about 75° C. to about 106° C.

The flame retardant acrylic copolymer may have an index of refraction at a thickness of 2.5 mm from about 1.491 to about 1.584, for example, from about 1.511 to about 1.570.

The flame retardant acrylic copolymer may contain about 0.1 wt % to about 7.5 wt % of phosphorus. Within this range, the flame retardant acrylic copolymer can have excellent flame retardancy and improved property balance. In addition, the flame retardant acrylic copolymer may have a flame retardancy level of V2 or higher, as measured on a 3.2 mm thick specimen in accordance with UL94.

The flame retardant acrylic copolymer may have a transmittance of about 85% or more, for example, about 85% to about 92%, as measured on a 2.5 mm thick specimen in accordance with ASTM D1003

The flame retardant acrylic copolymer may have a scratch width of about 250 µm or less, for example, from about 185 µm to about 245 µm, as measured on a 2.5 mm thick specimen under a load of 1,000 g at a scratch speed of 75 mm/min using a spherical metal tip having a diameter of 0.7 mm in accordance with a BSP (Ball-type Scratch Profile) test.

The prepared flame retardant acrylic copolymer may be prepared in pellet form through extrusion. Extrusion may be performed by a typical method known in the art. Further, extrusion of the flame retardant acrylic copolymer may be performed by adding at least one of additives, such as flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, flame-proofing agents, and the like, to the flame retardant acrylic copolymer.

Another aspect of the present invention relates to a resin composition including the flame retardant acrylic copolymer. The resin composition may include a resin compatible with the flame retardant acrylic copolymer. For example, the flame retardant acrylic copolymer may be blended with a thermoplastic resin, such as polycarbonate, polyethylene, and polystyrene resins, without being limited thereto. Preferably, polycarbonate is used.

A further aspect of the present invention relates to a molded article including the flame retardant acrylic copolymer. The molded article may be prepared by molding a resin composition including the flame retardant acrylic copolymer or a blend of the flame retardant acrylic copolymer with other resins. Examples of molding methods include extrusion molding, injection molding, and casting, without being limited thereto. These molding methods are well known to those skilled in the art. For example, the resin composition may be prepared in pellet form by simultaneously mixing the above components and other additives, followed by melt-extrusion in an extruder. The prepared pellets may be formed into various molded articles through various molding methods, such as injection molding, extrusion molding, and the like.

The molded article may include various plastic molded articles. Since the composition including the flame retardant acrylic copolymer according to the present invention exhibits excellent properties in terms of scratch resistance, impact strength, transparency, and moldability, the resin composition may be applied to molding of various articles. Particularly, the molded articles may be broadly applied as exterior materials of various electric and electronic components, parts or automobile components, lenses, window glass, and the like. For example, the molded articles may include housings for electric/electronic home appliances, such as televisions, audio systems, washing machines, cassette players, MP3 players, telephones, game consoles, video players, computers, photocopiers, and the like, and interior/exterior materials of automobiles, such as dashboards of automobiles, instrument panels, door panels, quarter panels, wheel covers, and the like.

Next, the present invention will be described in more detail with reference to some examples. It should be understood that these examples are provided for illustration only and are not to be construed in any way as limiting the present invention.

Descriptions of details apparent to those skilled in the art will be omitted.

MODE FOR INVENTION

Examples

Components used in Examples and Comparative Examples are as follows.
(A) (Meth)acrylic monomer: methyl methacrylate
(B) Vinyl monomer: (B1) styrene, (B2) acrylonitrile
(C) Phosphorus-based (meth)acrylic monomer: (C1) diethyl(methacryloyloxymethyl)phosphonate, (C2) dimethyl (methacryloyloxymethyl)phosphonate Example 1

0.3 parts by weight of n-mercaptan was uniformly mixed with 100 parts by weight of a monomer mixture including 65 wt % of methyl methacrylate, 22.5 wt % of styrene, 7.5 wt % of acrylonitrile, and 5 wt % of diethyl(methacryloyloxymethyl)phosphonate. In a stainless steel high pressure reactor including a stirrer, small amounts of disodium hydrogen phosphate, sodium sulfate, and the like were dissolved in 130 parts by weight of deionized water, and 0.15 parts by weight of polymethyl acrylate-methyl acrylic acid was added to the mixture, followed by stirring. The reactor was filled with an inert gas including nitrogen. Then, the mixture was heated at 72° C. for 3 hours and at 110° C. for 2 hours for polymerization. After completion of the reaction, a flame retardant acrylic copolymer was prepared in particle form through washing, dehydration and drying. The prepared flame retardant acrylic copolymer had a glass transition temperature of 96.3° C., a weight average molecular weight of 130,000 g/mol, and an index of refraction of 1.514.

Examples 2 to 7 and Comparative Examples 1 to 4

Acrylic copolymers were prepared in the same manner as in Example 1 except that the kind of monomer and the contents thereof were changed as in Table 1. Here, all of these copolymers were prepared to have a weight average molecular weight of 130,000 g/mol.

0.1 parts by weight of a hindered phenol-based heat stabilizer was added to the prepared acrylic copolymer, followed by melting, kneading and extrusion, thereby preparing pellets. Here, extrusion was performed using a twin-screw extruder (L/D=29) having a diameter of 45 mm, and the prepared pellets were dried at 80° C. for 6 hours, followed by injection molding using a 6 oz injection machine, thereby preparing specimens. The prepared specimens were evaluated as to index of refraction, flame retardancy, haze, and total light transmittance. Results are shown in Tables 1.

Property Evaluation (1) Weight average molecular weight (g/mol) was measured by GPC (Gel Permeation Chromatography).

(2) Glass transition temperature Tg (° C.) was measured using a differential scanning calorimeter (DSC).

(3) Index of refraction was measured on a 2.5 mm thick specimen at 20° C. using a refractometer DR-A1 (ATAGO).

(4) Flame retardancy was measured on a 3.2 mm thick specimen in accordance with UL 94 standard.

(5) Transmittance (%): Transparency of a specimen can be evaluated according to haze and total transmittance (TT) of the specimen. Total transmittance was measured on a 2.5 mm thick specimen using a Hazemeter NDH 2000 (Nippon Denshoku Co. Ltd.) in accordance with ASTM D1003. Total light transmittance was calculated from the sum of diffuse light transmittance (DF) and parallel light transmittance (PT). A higher total light transmittance (TT) and lower haze indicate higher transparency.

(6) Scratch resistance (μm) was measured on a 2.5 mm thick specimen by a pencil hardness test and a ball-type scratch profile (BSP) test in accordance with JIS K5401. In the BSP test, a 10 mm to 20 mm long scratch was applied to a surface of a resin under a load of 1,000 g at a scratch speed of 75 mm/min using a spherical metal tip having a diameter of 0.7 mm. As an indicator of scratch resistance, a scratch width (μm) was measured by measuring a profile of the applied scratch using a contact type surface profile analyzer XP-1 (Ambios Co., Ltd.). At this time, the scratch width was measured by surface scanning a profile of the applied scratch with a metal stylus tip having a diameter of 2 μm.

TABLE 1

|  |  | Example | | | | | | | Comparative Example | | | |
| --- | --- | --- | --- | --- | --- | --- | --- | --- | --- | --- | --- | --- |
| Kind | | 1 | 2 | 3 | 4 | 5 | 6 | 7 | 1 | 2 | 3 | 4 |
| (A) | | 65 | 40 | 60 | 40 | 60 | 40 | 40 | 70 | 50 | 90 | 70 |
| (B) | (B1) | 22.5 | 22.5 | 22.5 | 37.5 | 22.5 | 22.5 | 37.5 | 22.5 | 37.5 | — | — |
|  | (B2) | 7.5 | 7.5 | 7.5 | 12.5 | 7.5 | 7.5 | 12.5 | 7.5 | 12.5 | — | — |
| (C) | (C1) | 5 | 30 | 10 | 10 | — | — | — | — | — | 10 | 30 |
|  | (C2) | — | — | — | — | 10 | 30 | 10 | — | — | — | — |
| Tg(° C.) | | 96.3 | 79.3 | 93.5 | 90.3 | 104.3 | 90.1 | 100.4 | 105.1 | 101.7 | 110.0 | 102.0 |
| Index of refraction | | 1.514 | 1.513 | 1.514 | 1.530 | 1.514 | 1.514 | 1.530 | 1.514 | 1.530 | 1.490 | 1.490 |
| Flame retardancy (UL94) | | V2 | V0 | V2 | V2 | V2 | V0 | V2 | Fail | Fail | Fail | V2 |
| Transmittance (%) | | 87 | 86 | 86 | 85 | 87 | 86 | 85 | 87 | 87 | 88 | 87 |
| Pencil hardness | | 2H | H | 2H | 2H | 2H | 2H | 2H | 2H | 2H | 2H | 2H |
| BSP Width (μm) | | 215 | 249 | 223 | 232 | 211 | 220 | 220 | 213 | 220 | 200 | 230 |

In Table 1, it can be seen that the flame retardant acrylic copolymers of Examples 1, 2, 5 and 6 exhibited better flame retardancy than the acrylic copolymer of Comparative Example 1, which did not contain the phosphorus-based (meth)acrylic monomer. The same result could be confirmed from Examples 4 and 7 and Comparative Example 2. On the other hand, the acrylic copolymer of Comparative Example 3, which did not include the aromatic vinyl monomer or the unsaturated nitrile monomer, had a lower index of refraction than the flame retardant acrylic copolymer of Example 4, and was deteriorated in flame retardancy, despite the same content of the phosphorus-based (meth)acrylic monomer. The same result could be conformed from Example 2 and Comparative Example 4.

It should be understood that various modifications, changes, alterations, and equivalent embodiments can be made by those skilled in the art without departing from the spirit and scope of the invention.

The invention claimed is:

1. A flame retardant acrylic copolymer comprising a derivative unit obtained from a monomer mixture including:
   (A) a (meth)acrylic monomer;
   (B) at least one vinyl monomer selected from the group consisting of an aromatic vinyl monomer and an unsaturated nitrile monomer; and
   (C) a phosphorus-based (meth)acrylic monomer represented by Formula 1:

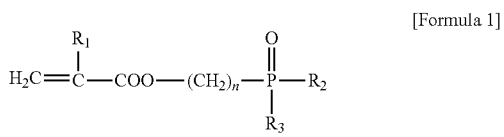

[Formula 1]

wherein $R_1$ is hydrogen or a methyl group; n is an integer from 0 to 10; and $R_2$ and $R_3$ are each independently $-O(CH_2)_q X$, in which q is an integer from 0 to 3 and X is a $C_1$ to $C_6$ substituted or unsubstituted aliphatic hydrocarbon, a $C_5$ to $C_{20}$ substituted or unsubstituted alicyclic hydrocarbon, or a $C_6$ to $C_{20}$ substituted or unsubstituted aromatic hydrocarbon,
   the flame retardant acrylic copolymer having a weight average molecular weight from about 5,000 g/mol to about 500,000 g/mol and a glass transition temperature (Tg) from about 60° C. to about 110° C.

2. The flame retardant acrylic copolymer according to claim 1, wherein at least one of $R_2$ and $R_3$ is $-O-CH_3$.

3. The flame retardant acrylic copolymer according to claim 1, wherein the flame retardant acrylic copolymer is a copolymer of a monomer mixture including: about 5 wt % to about 94 wt % of the (A) (meth)acrylic monomer; about 5 wt % to about 94 wt % of the (B) vinyl monomer; and about 1 wt % to about 50 wt % of the (C) phosphorus-based (meth) acrylic monomer.

4. The flame retardant acrylic copolymer according to claim 1, wherein the (A) (meth)acrylic monomer comprises a structure represented by Formula 2:

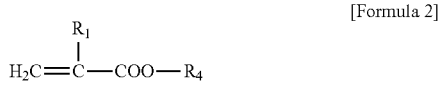

[Formula 2]

wherein $R_1$ is hydrogen or a methyl group; and $R_4$ is a $C_1$ to $C_{20}$ substituted or unsubstituted aliphatic hydrocarbon, a $C_5$ to $C_{20}$ substituted or unsubstituted alicyclic hydrocarbon, or a $C_6$ to $C_{20}$ substituted or unsubstituted aromatic hydrocarbon.

5. The flame retardant acrylic copolymer according to claim 1, wherein the (B) vinyl monomer comprises at least one selected from the group consisting of styrene, p-methylstyrene, α-methylstyrene, halogen or alkyl-substituted styrene, acrylonitrile, and methacrylonitrile.

6. The flame retardant acrylic copolymer according to claim 1, wherein the (C) phosphorus-based (meth)acrylic monomer comprises at least one selected from the group consisting of dimethyl(methacryloyloxymethyl)phosphonate, dimethyl(methacryloyloxyethyl)phosphonate, dimethyl(acryloyloxymethyl)phosphonate, methylethyl(methacryloyloxymethyl)phosphonate, methylethyl(acryloyloxymethyl)phosphonate, diethyl(methacryloyloxymethyl)phosphonate, diethyl(methacryloyloxyethyl)phosphonate, diethyl(acryloyloxymethyl)phosphonate, dipropyl(methacryloyloxymethyl)phosphonate, and dipropyl(methacryloyloxyethyl)phosphonate.

7. The flame retardant acrylic copolymer according to claim 1, wherein the flame retardant acrylic copolymer has an index of refraction at a thickness of 2.5 mm from about 1.491 to about 1.584.

8. The flame retardant acrylic copolymer according to claim 1, wherein the flame retardant acrylic copolymer contains about 0.1 wt % to about 7.5 wt % of phosphorus, and has a flame retardancy level of V2 or higher as measured on a 3.2 mm thick specimen in accordance with UL94.

9. The flame retardant acrylic copolymer according to claim 1, wherein the flame retardant acrylic copolymer has a transmittance of about 85% or more, as measured on a 2.5 mm thick specimen in accordance with ASTM D1003.

10. The flame retardant acrylic copolymer according to claim 1, wherein the flame retardant acrylic copolymer has a scratch width of about 250 μm or less, as measured on a 2.5 mm thick specimen under a load of 1,000 g at a scratch speed of 75 mm/min using a spherical metal tip having a diameter of 0.7 mm in accordance with a BSP (Ball-type Scratch Profile) test.

11. A composition comprising:
the flame retardant acrylic copolymer according to claim 1, and
at least one selected from among flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, and flame-proofing agents.

12. A resin composition comprising:
the flame retardant acrylic copolymer according to claim 1; and
a polycarbonate resin.

13. A molded article comprising the flame retardant acrylic copolymer according to claim 1.

* * * * *